United States Patent [19]
Holland

[11] 3,974,439
[45] Aug. 10, 1976

[54] WIDE DYNAMIC CURRENT RANGE SWITCHING REGULATOR

[75] Inventor: Varnum Smith Holland, Lewisville, Tex.

[73] Assignee: Texas Instruments Incorporated, Dallas, Tex.

[22] Filed: Mar. 5, 1975

[21] Appl. No.: 555,510

[52] U.S. Cl. ............................ 323/17; 321/2; 323/22 T; 323/DIG. 1
[51] Int. Cl.² ............................ G05F 1/60
[58] Field of Search ............ 308/296, 297; 321/2, 321/18; 323/17, 22 T, DIG. 1

[56] References Cited
UNITED STATES PATENTS

| | | | |
|---|---|---|---|
| 3,381,202 | 4/1968 | Loucks et al. | 323/DIG. 1 |
| 3,571,697 | 3/1971 | Phillips | 323/22 T |
| 3,579,090 | 5/1971 | Madsen | 323/22 T |
| 3,869,660 | 3/1975 | Davis et al. | 323/DIG. 1 |

Primary Examiner—A. D. Pellinen
Attorney, Agent, or Firm—Harold Levine; Stephen S. Sadacca

[57] ABSTRACT

A switching regulator is adaptable for connection to a DC power source to serve as a power supply. A self-oscillating switching regulator has an output voltage feedback circuit connected thereto which interrupts the self-oscillating circuit when the output voltage rises above a prescribed level. The current that flows through a power switch of the regulator is sensed and when it gets beyond a predetermined amount, a Schmidt trigger circuit is turned off. The Schmidt trigger circuit then turns off the power switch, permitting the inductor in the switching regulator circuit to supply current to an output filter capacitor. When the voltage across the capacitor builds up to a prescribed level, the feedback circuit detects the level and deactivates the Schmidt trigger which turns off the power switch.

13 Claims, 1 Drawing Figure

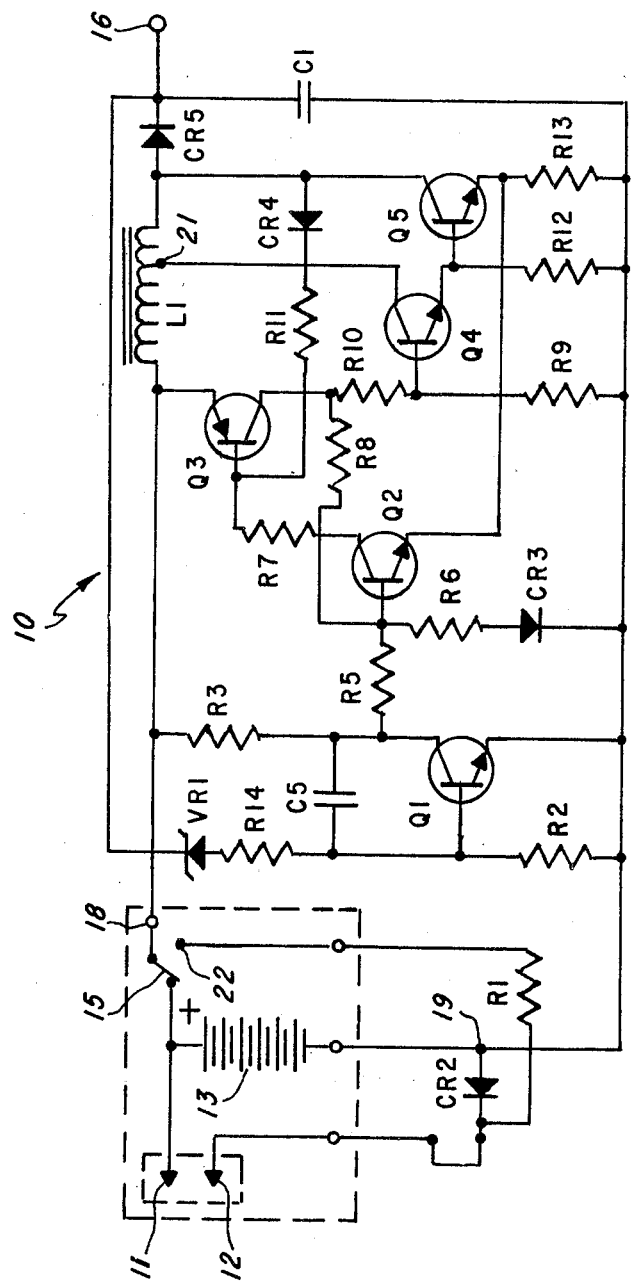

WIDE DYNAMIC CURRENT RANGE SWITCHING REGULATOR

BACKGROUND OF THE INVENTION

1. Field of the Invention

This invention pertains to power supplies for connection to DC sources, typically batteries. More specifically, it relates to a switching regulator power supply having an output voltage feedback circuit that interrupts a self-oscillating portion of the voltage regulator when the output voltage reaches a prescribed level.

2. Description of the Prior Art

Unregulated secondary inverters have been provided to supply power. These devices are difficult to regulate. Secondary regulators are typically used, causing a reduction in circuit efficiency and a more expensive power supply. Also, switching regulator power supplies have been provided which use a blocking oscillator technique to alter the amount of energy transferred per cycle.

The switching regulator power supply herein described and claimed utilizes a technique of transferring substantially the same amount of energy each cycle, but varying the frequency of transfer, thereby providing high efficiency over a wide range of current demands. This represents a significant advantage over the prior art.

BRIEF SUMMARY OF THE INVENTION

Generally, in the preferred embodiment, a switching regulator power supply utilizes an inductor having one end tied to one side of a DC power source and having the other end connected to a Darlington amplifier acting as a power switch and controlled by a Schmidt trigger. The other side of the Darlington amplifier, from the emitter of the power driver, is connected through a sensing resistor to the other side of the DC power source. The base of the input transistor of the Schmidt trigger is also connected through a resistive network to the other side of the DC power source. The emitter of the Schmidt input transistor is connected to the emitter of the power driver with the resistance between its base and the other side of the DC power source being chosen so that when the current through the sensing resistor reaches a particular level, the Schmidt trigger input transistor is cut off. The Schmidt trigger then causes the power switch circuit to cut off, permitting current to flow from the inductor into a filter capacitor. When the current through the sensing resistor drops to zero, the Schmidt trigger is again turned on and the cycle is repeated.

However, this self-oscillating circuit is not permitted to oscillate freely when the output voltage reaches a predetermined level. At that time, the output voltage feedback circuit itself turns off the Schmidt trigger.

The principal object of this invention, therefore, is to provide a lightweight, compact and reliable power supply for connection across a DC source power.

Another object of this invention is to provide a switching regulator power supply that changes frequency with load, but transfers substantially the same amount of energy each cycle. This enables the power supply to maintain a high constant efficiency over a load range of 100:1.

These and other objects will be made more evident in the detailed description that follows.

BRIEF DESCRIPTION OF THE DRAWING

The single drawing is a schematic diagram of the switching regulator power supply of this invention.

DETAILED DESCRIPTION OF THE INVENTION

FIG. 1 illustrates a battery 13 which may be used as a DC power source for the regulator 10. Input terminals 11 and 12 are intended to accommodate a converter which can be used to charge the battery 13. On/off switch 15 permits DC power to be applied.

Transistors Q2 and Q3 and their associated circuitry form a Schmidt trigger. Transistors Q4 and Q5 and their associated circuitry form a Darlington amplifier which acts as a power switch for the regulator.

The input transistor Q2 to the Schmidt trigger has its collector connected through R7 to the base of transistor Q3. The base of transistor Q3 is also connected through resistor R11 to the cathode of diode CR4, whose anode is connected to the collector of output driver transistor Q5. The combination of diode CR4 and resistor R11 provide a feedback path to keep transistor Q3 cut off during the energy transfer as will be described in detail below. The emitter of transistor Q3 is connected to terminal 18 of the DC power input and also to one end of inductor L1 whose other end is connected to the anode of diode CR4 and to the anode of diode CR5 whose cathode is connected to output terminal 16 and to one side of output filter capacitor C1, the other side of which is tied to terminal 19, the other side of the DC input power source. The collector of transistor Q3 is tied through positive feedback resistor R8 to the base of transistor Q2 and also through resistor R10 to the base of transistor Q4. The base of transistor Q2 is also connected through resistor R6 to the anode of diode CR3 whose cathode is tied to terminal 19. The emitter of transistor Q2 is tied to the emitter of transistor Q5. The emitter of transistor Q5 is also tied, through sensing resistor R13, to terminal 19. The base of transistor Q5 is tied through resistor R12 to terminal 19 and to the emitter of transistor Q4. The collector of transistor Q4 is tied to a tap point 21 on inductor L1 and its base is connected through resistor R9 to terminal 19.

An output voltage feedback circuit is provided by transistor Q1, Zener diode VR1 and associated circuitry. The anode of Zener diode VR1 is connected through resistor R14 to one side of high frequency load response capacitor C5, to the base of transistor Q1 and through resistor R2 to terminal 19. The other side of capacitor C5 is tied through resistor R3 to terminal 18, to the collector of transistor Q1 and through resistor R5 to the base of Schmidt trigger input transistor Q2. The emitter of transistor Q1 is connected to terminal 19 and the cathode of zener diode VR1 is connected to output terminal 16.

The DC power input is shown with terminals 11 and 12 for receiving the output from a converter that supplies AC or DC power and which can be used for charging battery 13 shown connected between input terminal 11 and the anode of diode CR2 whose cathode is connected to input terminal 12. Resistor R1 provides a load when the power supply is turned off and the battery is being recharged. On/off switch 15 permits the DC power source to be applied to the regulator circuit 10.

PREFERRED MODE OF OPERATION

To understand the operation of the circuit, assume that there is no output voltage present at terminal 16 and that switch 15 has just been moved to the on position. Then a positive voltage is impressed through resistors R3 and R5 to the base of Schmidt trigger input transistor Q2, whose emitter is at a lower potential. Transistor Q2 is turned on which turns on transistor Q3, the other transistor of the Schmidt trigger. When that transistor is turned on, current flows through resistors R9 and R10 causing the base of transistor Q4 to go positive with respect to its emitter, turning it on which results in the other transistor of the Darlington pair, Q5, to also be turned on. Inductor L1 has a current buildup, the current flowing through sensing resistor R13. In this preferred embodiment, resistor R13 has a value of 0.03 ohms. When approximately 12 amperes flow through R13, resulting in a voltage drop on the order of one semiconductive junction forward voltage drop or less, e.g., approximately 0.36 volts, transistor Q2 begins to turn off because the value of resistor R6 in combination with CR3 is selected to produce an identical drop, and thus the base and the emitter of Q2 are at the same potential. The turning off of Q2 tends to turn off Q3, resulting in the lowering of the voltage at the junction between resistors R8 and R10. The positive feedback provided through R8 to the base of transistor Q2 tends to further lower the voltage on the base of Q2, positively turning that transistor off. The voltage on the base of Q4 also is reduced, turning off Q4, which results in the output driver Q5 also being turned off. When transistor Q5 is cut off, the current through sensing resistor R13 goes to 0, which tends to cause transistor Q2 to again turn on which would result in the entire Schmidt trigger turning on, turning on the Darlington pair Q4 and Q5. However, when transistor Q5 is turned off, the inductor L1 discharges current through diode CR5 into the output filter capacitor C1. The positive polarity permits conduction through diode CR4 and resistor R11 to the base of PNP transistor Q3, holding that transistor off until L1 has discharged to the point where Q3 can again begin conduction. When that occurs, current again flows through sensing resistor R13 until a prescribed voltage is reached at which time the Schmidt trigger is turned off, turning off the Darlington pair and permitting the inductor L1 to discharge again into capacitor C1. C1 then is charged to provide an output voltage at terminal 16. In this preferred embodiment, the output voltage is selected at approximately 18 volts. Zener diode VR1 is selected to break down at that voltage and maintain it.

When sufficient oscillations have occurred to bring the voltage up to the desired voltage, the oscillations continue at a lower frequency (depending on the load on the power supply). When the output voltage drops, a decrease in voltage on the base of transistor Q1 occurs, causing that transistor to turn off. When transistor Q1 turns off, the voltage on its collector goes positive, being transmitted through R5 to the base of transistor Q2, turning that transistor on and thereby turning on the Darlington pair once more.

Each energy transfer cycle is substantially identical to all others, only the frequency of transfer or duty cycle being affected by the output voltage feedback circuit. Thus, there is high efficiency over a large load variation. The inductor L1 affects only the free running frequency of oscillation and has no effect on the frequency as determined by the output voltage feedback circuit.

It is contemplated that other devices may be used without departing from the scope of this invention. For example, it is only a matter of circuit design as to the precise voltage selected across resistor R13 to cut off the transistor Q2, as discussed above. Also, the transistor types may be reversed and use of field effect devices is also contemplated.

What is claimed is:

1. A semiconductor switching regulator power supply for connection to a DC power source, having an output terminal and an inductor with one terminal thereof coupled to one polarity of the DC power source and with a second terminal thereof coupled to said output terminal, comprising:
   a. power switch means coupled to the second terminal of said inductor;
   b. a trigger circuit including at least one semiconductor device having a junction forward voltage drop of n volts, said trigger circuit being coupled to said power switch means, toggling said power switch means to a conducting state when said at least one semiconductor device is in a conducting state and to a non-conducting state when said at least one semiconductor device is in a non-conducting state;
   c. current sensing means coupled to said trigger circuit, to said power switch means, and to the other polarity of said DC power source for providing a current path through said inductor and said power switch means to the other polarity of said DC power source, said current sensing means biasing said at least one semiconductor device into a non-conducting state when the voltage drop across said current sensing means exceeds a predetermined value, said predetermined value being on the order of n volts or less;
   d. voltage charging means coupled to the second terminal of said inductor for receiving current from said inductor when said power switch means is in said non-conducting state and for providing an output voltage to said output terminal; and
   e. output voltage feedback means coupled to said output terminal and said trigger circuit and responsive to said output voltage for temporarily biasing said at least one semiconductor device into a conducting state when said output voltage drops below a preselected value.

2. The power supply of claim 1 wherein the power switch means comprises a Darlington current amplifying circuit.

3. The power supply of claim 2 wherein the trigger circuit comprises a Schmidt trigger.

4. The power supply of claim 3 wherein the current sensing means comprise a sensing resistor connected between the Darlington circuit and the other polarity of the DC power source and between the Schmidt trigger circuit and the other polarity of the DC power source wherein said power supply further comprises a first resistor connected between the input terminal of the Schmidt trigger and the other polarity of the power source.

5. The power supply of claim 4 wherein the output voltage feedback means comprise:
   a. a first semiconductor device having a first main electrode operatively connected to the one polarity of the DC power source, a second main electrode connected to the other polarity of the DC power source, and a control electrode operatively connected to the other polarity of the DC power source; and b. a Zener diode having its anode connected to the control electrode of the first semiconductor device and having its cathode connected to the output terminal for regulating the output voltage.

6. The power supply of claim 5 wherein the inductor further has a voltage tap, and the Darlington circuit comprises:

a. i. a second semiconductor device having a first main electrode connected to the voltage tap on the inductor, a second main electrode, and a control electrode connected to the Schmidt trigger circuit; and ii. a third semiconductor device having a first main electrode connected to the second terminal of the inductor, a second main electrode connected to the sensing resistor and a control electrode connected to the second main electrode of the second semiconductor device.

7. The power supply of claim 6 wherein the Schmidt trigger circuit comprises:

b. i. a fourth semiconductor device having a first main electrode, a second main electrode connected to the second main electrode of the third semiconductor device, and a control electrode connected to the first resistor and to the first main electrode of the first semiconductor device; and ii. a fifth semiconductor device having a first main electrode connected to the control electrode of the second semiconductor device and a second main electrode connected to one polarity of the DC power source and a control electrode connected to the first main electrode of the fourth semiconductor device.

8. The power supply of claim 7 further comprising:

f. a first feedback circuit connecting the first main electrode of the fifth semiconductor device and the control electrode of the second semiconductor device to the control electrode of the fourth semiconductor device; and g. a second feedback circuit connected between the second terminal of the inductor to the control electrode of the fifth semiconductor device to keep that device turned off when current is being transferred from said inductor to said voltage charging means.

9. The power supply of claim 1 wherein the trigger circuit comprises a Schmidt trigger.

10. The power supply of claim 1 wherein the output voltage feedback means comprise:

a. a first semiconductor device having a first main electrode operatively connected to the one polarity of the DC power source, a second main electrode connected to the other polarity of the DC power source, and a control electrode operatively connected to the other polarity of the DC power source; and b. a Zener diode having its anode connected to the control electrode of the first semiconductor device and having its cathode connected to the output terminal for regulating the output voltage.

11. A switching regulator power supply for connection to a DC power source having a tapped inductor with one end operatively connected to one side of the power source and with the other end operatively connected to an output terminal, comprising:

a. a Darlington current amplifying circuit, comprising:

i. a first semiconductor device having a first main electrode connected to the voltage tap on the inductor, a second main electrode, and a control electrode connected to the Schmidt trigger circuit; and ii. a second semiconductor device having a first main electrode connected to the other end of the inductor, a second main electrode connected to the sensing resistor and a control electrode connected to the second main electrode of the first semiconductor device;

b. a Schmidt trigger circuit, operatively connected to the power switch to operate the power switch;

c. a sensing resistor connected between the Darlington circuit and the other side of the DC power source and between the Schmidt trigger circuit and the other side of the DC power source to control the Schmidt trigger circuit and to provide a current path through the inductor and through the power switch to the other side of the DC power source;

d. a first resistor connected between the input terminal of the Schmidt trigger and the other side of the power source;

e. voltage charging means, operatively connected to the other end of the inductor, for receiving current from the inductor when the power switch is opened, and for providing an output voltage to the output terminal; and f. output voltage feedback means connected to the output voltage terminal and responsive to the output voltage, and connected to the trigger circuit for turning on the trigger circuit when the output voltage drops below a prescribed level, said output voltage feedback means comprising:

i. a third semiconductor device having a first main electrode operatively connected to the one side of the DC power source, a second main electrode connected to the other side of the DC power source, and a control electrode operatively connected to the other side of the DC power source; and ii. a Zener diode having its anode connected to the control electrode of the semiconductor device and having its cathode connected to the output terminal for regulating the output voltage.

12. The power supply of claim 11 wherein the Schmidt trigger circuit comprises:

b. i. a fourth semiconductor device having a first main electrode, a second main electrode connected to the second main electrode of the second semiconductor device, and a control electrode connected to the first main electrode of the third semiconductor device; and ii. a fifth semiconductor device having a first main electrode connected to the control electrode of the first semiconductor device and a second main electrode connected to one side of the DC power source and a control electrode connected to the first main electrode of the fourth semiconductor device.

13. The power supply of claim 12 further comprising:

f. a first feedback circuit connecting the first main electrode of the fifth semiconductor device and the control electrode of the first semiconductor device to the control electrode of the fourth semiconductor device; and g. a second feedback circuit connected between the other end of the inductor to the control electrode of the fifth semiconductor device to keep that device turned off during the energy transfer cycle.

* * * * *